Figure 1:
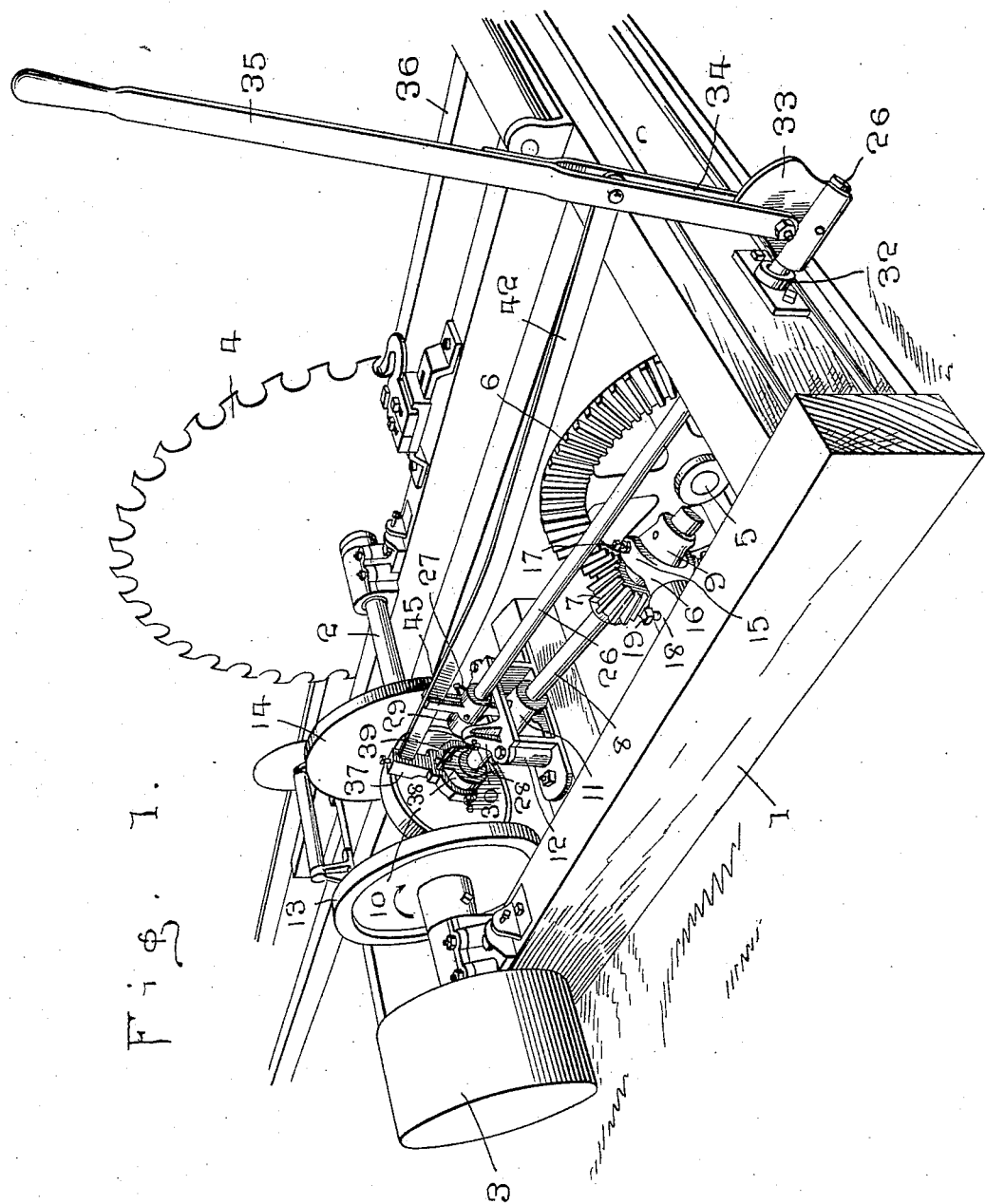

J. W. BELYEU.
GEARING.
APPLICATION FILED NOV. 10, 1908.

936,291.

Patented Oct. 12, 1909.
2 SHEETS—SHEET 1.

WITNESSES:
Thos. W. Riley
M. A. Newcomb

INVENTOR
J. W. Belyeu
By
W. J. FitzGerald
Attorneys

J. W. BELYEU.
GEARING.
APPLICATION FILED NOV. 10, 1908.
936,291.
Patented Oct. 12, 1909.
2 SHEETS—SHEET 2.
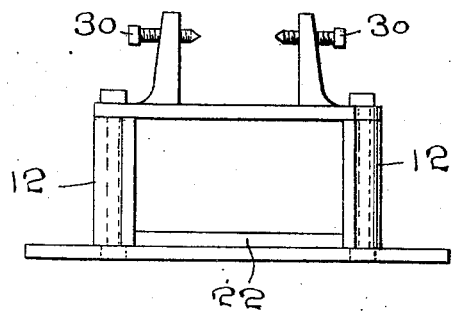
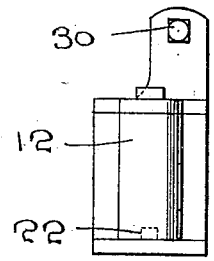
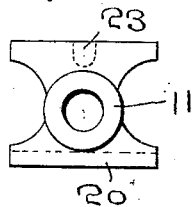
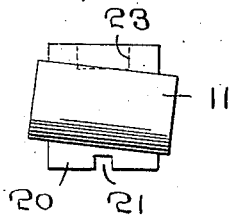
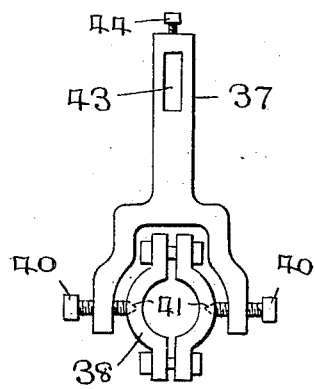
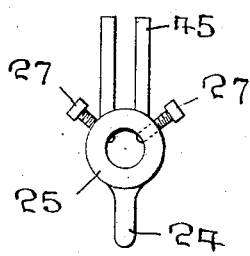
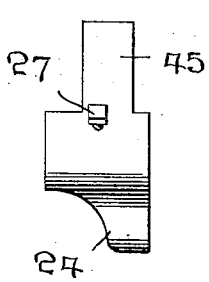
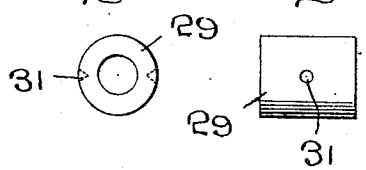
WITNESSES:
Thos. W. Riley
M. A. Newcomb
INVENTOR:
J. W. Belyeu
BY
W. J. FitzGerald & Co.
Attorneys

UNITED STATES PATENT OFFICE.

JOHN W. BELYEU, OF ALEXANDER CITY, ALABAMA.

GEARING.

936,291.

Specification of Letters Patent. Patented Oct. 12, 1909.

Application filed November 10, 1908. Serial No. 461,908.

*To all whom it may concern:*

Be it known that I, JOHN W. BELYEU, a citizen of the United States, residing at Alexander City, in the county of Tallapoosa and State of Alabama, have invented certain new and useful Improvements in Gearing; and I do hereby declare the following to be a full, clear, and exact description of the invention, such as will enable others skilled in the art to which it appertains to make and use the same.

My invention relates to new and useful improvements in controlling mechanisms for saw mills or similarly operated machinery and my object is to provide a friction drive for the log carriage.

A further object is to provide means for reversing the operation of the carriage drive.

A further object is to provide means for increasing or decreasing the speed of the driving mechanism and a still further object is to provide suitable adjustments for the parts of the driving mechanism.

Other objects and advantages will be hereinafter referred to and more particularly pointed out in the claims.

In the accompanying drawings which are made a part of this application, Figure 1 is a perspective view of a portion of a saw mill, showing my improved mechanism applied thereto. Fig. 2 is a side elevation of a bracket employed for supporting parts of the driving mechanism. Fig. 3 is an end elevation thereof. Fig. 4 is an end elevation of a sliding bearing for one of the parts of the driving mechanism. Fig. 5 is a side elevation thereof. Fig. 6 is an elevation of a shifting bar and parts to which the same is attached. Fig. 7 is an end elevation of a device employed for shifting the bearing shown in Fig. 4. Fig. 8 is a side elevation thereof, and Figs. 9 and 10 are end and side elevations, respectively, of a collar for supporting parts of the device.

Referring to the drawings in which similar reference numerals designate corresponding parts throughout the several views, 1 indicates a frame, such as is commonly used in connection with saw mill constructions, said frame having rotatably mounted thereon, a shaft 2, to one end of which is secured a belt wheel 3 and to the opposite end thereof, the usual or any preferred form of saw 4. In mills of this class, the log is placed upon a carriage and brought into contact with the saw 4, said carriage being driven through the medium of a shaft 5, on which are placed suitable cogs, which are adapted to engage with cog racks on the log carriage, but as the carriage and parts to drive the same, form no part of my invention, it is not deemed necessary to further describe the same.

Motion is imparted to the shaft 5 by placing thereon a cog gear 6, with which is adapted to mesh a pinion 7, carried on a shaft 8, one end of the shaft 8 being mounted in a bearing 9, while the opposite end thereof has fixed thereto a friction wheel 10, said shaft, in its passage from the bearing 9 to the wheel 10, extending through a sliding bearing 11, which bearing is entered in a bracket 12, carried between the side bars of the frame 1.

As that end of the shaft 8 containing the friction wheel 10, is adapted to be swung laterally to bring the friction wheel into engagement with either of the disks 13 or 14, carried by the shaft 2, the bearing 9 is movably mounted between the bifurcated end 15 of a stub shaft 16, said shaft being in turn carried by one of the side members of the frame 1.

The bearing 9 is pivotally held between the bifurcated ends 15, by introducing screws 17 through said ends and into engagement with the bearing, so that said bearing may swing laterally to compensate for the swinging movement of the shaft 8, while the stub shaft 16 is adjustably secured to the frame 1 by introducing the end thereof into a socket 18 and providing a set screw 19 for holding the stub shaft in its adjusted position.

The sliding bearing 11 is provided in its base portion 20 with a slot 21, which is adapted to engage a rib 22 on the bracket, said rib holding the bearing 11 firmly seated in the bracket 12 and at the same time permitting said bracket to move laterally.

Formed in the upper portion of the bearing 11, is a recess 23, in which is adapted to enter a stem 24, depending from a cylindrical body 25 mounted upon a controlling shaft 26, said body being secured to said controlling shaft in any preferred manner, as by means of set screws 27.

Extending upwardly from the bracket 12, are standards 28, between which is located a collar 29, which collar forms a bearing for one end of the shaft 26 and is supported between the standards by means of bolts 30, the inner ends of which bolts are pointed and enter counter-sinks 31 in the face of the controlling collar. The opposite end of the controlling shaft 26 is entered through a socket 32 in the end bar of the frame 1, the extended end of the shaft having fixed thereto a plate 33, to which is secured the bifurcated end 34 of a lever 35 and as the lever 35 is pivoted to the plate at a point adjacent its connection with the shaft 26, a sufficient portion of the plate 33 will extend between the bifurcated end 34 to cause the shaft 26 to rotate when the lever 35 is swung laterally and as the body 25 is fixed to said shaft, the rotation thereof will move the bearing 11 longitudinally of the rib 22 and bring the friction wheel 10 into engagement with one of the disks between which the friction wheel is located, the object of shifting the friction wheel, being to reverse the rotation of the shaft 8 and parts operated thereby to move the log carriage 36 forwardly or rearwardly.

It is desirable at times to increase or decrease the speed of the log carriage and to this end I have provided means for moving the friction wheel 10 longitudinally of the shaft 8 and toward or from the axial centers of the disks 13 and 14, consisting of a shifting bar 37, the lower end of which bar is bifurcated to straddle a split collar 38 surrounding the hub 39 of the friction wheel 10, bolts 40 being introduced through the bifurcated ends of the shifting bar and into engagement with the split collar, the inner ends of said bolts being tapered and entered in cavities 41 in the collar.

The lever 35 is connected to the shifting bar 37 by means of a link 42, one end of the link being pivotally mounted between the bifurcated end of the lever, while the opposite end of the link is introduced through a slot 43 in the upper end of the shifting bar 37, said link being held in the slot by means of a set screw 44, extending through the upper end of the shifting bar and in position to bind on the upper edge of the interposed portion of the link 42 and it will be readily seen that when the lever 45 is swung forwardly or rearwardly, the friction wheel 10 will be moved toward or from the axial centers of the disks 13 and 14, the link 42 being entered between guide arms 45 extending upwardly from the body 25, said arms adding rigidity to the link and causing the shifting bar to rotate around the hub of the friction wheel when the lever 35 is swung laterally to reverse the travel of the log carriage.

In operation, when it is desired to move the log into engagement with the saw, the lever 35 is swung laterally to the left, thus moving the friction wheel 10 into engagement with the disk 14, the lever being held in this position until the saw is passed entirely through the log or until such time as it is desired to reverse the log carriage, when the lever 35 is swung laterally to the right until the friction wheel 10 is brought into engagement with the disk 13 and as soon as the log carriage has been returned to its initial position, the lever 35 is immediately swung to a vertical position, thus disengaging the friction wheel from both of the disks and permitting the log carriage and gears which operate the same to remain idle until such time as it is again desired to move the log into engagement with the saw.

If, while the carriage is being moved forwardly or rearwardly, it is desired to decrease the speed of the carriage, the lever 35 is thrown forwardly, thereby moving the friction wheel 10 toward the axial center of the disk with which it is engaged, while, if it is desired to increase the speed of the carriage, the lever 35 is thrown in the opposite direction or rearwardly and the friction wheel 10 moved toward the outer edge of the disk, this action increasing the speed of the carriage.

This device may be attached to any class of machinery where it is desired to reverse the operation of portions of the same or drive the machinery at different speeds, but is more particularly adaptable for use in connection with saw mill machinery and in view of the simplicity of the device, may be very cheaply constructed and installed at a minimum expense and amount of labor.

What I claim is:

1. A device of the character described, comprising a shaft disks carried thereby, an additional shaft a friction disk carried thereby arranged intermediate of the first-referred to disks and initially out of engagement with said disks, the latter shaft also being provided with a fixed hub member, a split collar embracing said hub member, a standard having connection with said split collar, a manually actuated lever, and a link connection between said standard and said lever.

2. A device of the character described, including a shaft spaced apart disks carried thereby, a second shaft a friction disk carried thereby arranged intermediate of the aforesaid disks and initially out of engagement therewith, a sleeve receiving the latter shaft having a groove in its lower surface, a frame member having a rib engaging said groove, said sleeve having a notch in its upper surface, a third shaft a sleeve member upper surface, a third shaft a sleeve member thereon provided with a pendent projection received by said notch and upstanding parallel members upon its upper surface, a sleeve a manually actuated lever having pivoted connection with said sleeve connected to the last-referred to shaft and a link connected to said shaft and received between the up-standing portions of said sleeve member.

3. A device of the character described, comprising a shaft spaced apart disks carried thereby, an additional shaft a friction disk carried thereby intermediate of the aforesaid disks adapted for contact with the latter disks, the latter shaft having a hub, a split collar embracing said hub, an upstanding arm having connection with said split collar, a third shaft a collar or sleeve applied thereto, a frame member a sleeve received thereby applied to the second shaft, said sleeve having slidable connection with said frame, and the second sleeve having connection with the latter sleeve, a manually actuated lever and a link connected to said lever and to the upstanding portion of said second sleeve.

4. A device of the character described, comprising a shaft spaced apart disks, a second shaft a friction disk carried thereby intermediate of the aforesaid disks for engagement with the latter, a hub applied to said second shaft, a split collar embracing said hub and a standard or arm having connection with said split collar, a sleeve applied to said second shaft, means for guiding the lateral movement of said sleeve, a third shaft a sleeve applied thereto, said sleeve having connection with the aforesaid sleeve, a manually actuated lever having pivotal connection with said third shaft, and a link connected to said lever and to said arm or standard of the last-referred to sleeve.

5. A device of the character described, comprising a shaft opposed disks carried thereby, a second shaft a friction disk carried thereby for engagement with the aforesaid disks, a hub fixed to said second shaft, a split collar applied to said hub, an upstanding arm or standard having connection with said collar, a sleeve receiving said second shaft, means for guiding the lateral movement of said second shaft, a third shaft, a sleeve applied to said third shaft bearing in the first-referred to sleeve, a manually actuated lever having pivotal connection with said third shaft and a link connection between said lever and said upstanding arm or standard of said second sleeve.

In testimony whereof I have signed my name to this specification in the presence of two subscribing witnesses.

JOHN W. BELYEU.

Witnesses:
B. L. YOUNG,
T. S. CHRISTIAN.